(12) United States Patent
van Egeraat

(10) Patent No.: US 6,874,941 B2
(45) Date of Patent: Apr. 5, 2005

(54) WHEEL HUB-AND-BEARING SET ASSEMBLY FOR A ROLLER SKATE

(75) Inventor: Hendrikus Adrianus van Egeraat, Örebro (SE)

(73) Assignee: PC-Vane Sportartikel GmbH, Bremerhaven (DE)

( * ) Notice: Subject to any disclaimer, the term of this patent is extended or adjusted under 35 U.S.C. 154(b) by 62 days.

(21) Appl. No.: 10/428,862

(22) Filed: May 5, 2003

(65) Prior Publication Data

US 2004/0223675 A1 Nov. 11, 2004

(51) Int. Cl.[7] ................................................. F16C 19/08
(52) U.S. Cl. ..................................... 384/449; 384/544
(58) Field of Search ................................ 384/449, 544, 384/537, 539, 589

(56) References Cited

U.S. PATENT DOCUMENTS

| | | | |
|---|---|---|---|
| 2,572,835 A | 10/1951 | Bloom | |
| 5,308,152 A | 5/1994 | Ho | |
| 5,470,086 A | 11/1995 | Peterson et al. | |
| 5,685,649 A | * 11/1997 | Jensen et al. | ................ 384/519 |
| 5,692,809 A | 12/1997 | Hook | |
| 6,109,796 A | * 8/2000 | Wershe | ........................ 384/544 |

OTHER PUBLICATIONS

European Search Report Mailed Sep. 1, 2004.

* cited by examiner

*Primary Examiner*—Lenard A. Footland
(74) *Attorney, Agent, or Firm*—Baker Botts L.L.P.

(57) ABSTRACT

A wheel hub-and-bearing set assembly for a roller skate includes a spacer, a sleeve formed with a first flange at one end thereof and having an outer face, a pair of bearings mounted in a space between the spacer and the sleeve, a hub body sleeved on the sleeve, and a bearing cap disposed at the other end of the sleeve and formed with a second flange that cooperates with the first flange and the outer face to define a retaining space thereamong. The hub body is formed with a tongue that is fittingly received in the retaining space.

4 Claims, 4 Drawing Sheets

WHEEL HUB-AND-BEARING SET ASSEMBLY FOR A ROLLER SKATE

BACKGROUND OF THE INVENTION

1. Field of the Invention

This invention relates to a wheel hub-and-bearing set assembly, more particularly to a wheel hub-and-bearing set assembly for a roller skate.

2. Description of the Related Art

A conventional wheel hub-and-bearing set assembly for a roller skate normally includes bearings, a bearing spacer that separates bearing inner rings of the bearings, and a hub body adapted to be connected to a tire and having bearing pockets in its center and sides that separate outer rings of the bearings and that are disposed around the bearing spacer. The bearings are mounted securely in the bearing pockets between the hub body at their outer ring and the bearing spacer at their inner ring, and usually have a pair of sealing caps mounted on two opposite sides of the hub body for preventing dirt from reaching the bearings.

The conventional wheel hub-and-bearing set assembly is disadvantageous as it is difficult to align the bearings with the bearing pockets on its outer ring and the spacer on it inner ring, while keeping the bearings true to the center and middle line of the wheel, as well as to the respective inner and outer rings. Incorrect alignment of all these different parts results in wobble of the wheel around its rotation center and consequently a pronounced wear of bearing as well as wheel tire, while also the outer rings of the bearings get distorted. In addition, since the bearings are tightly secured in the bearing pockets between the hub body and the bearing spacer, removal of the bearings from the bearing pockets is difficult to conduct. As a consequence, the service life of the wheel and the bearings is sharply reduced, while the competitive skaters cannot achieve the utmost attainable speed.

SUMMARY OF THE INVENTION

Therefore, the object of the present invention is to provide a wheel hub-and-bearing set assembly that is capable of overcoming the aforementioned drawbacks of the prior art and that includes bearing(s) that are perfectly aligned in separate set, in other words these bearing(s) do not need the aforesaid bearing pockets in the wheel hub in order to position the outer ring true to center and middle line of the wheel and the separate bearings to center which can be easily assembled and disassembled therefrom.

According to the present invention, there is provided a wheel hub-and-bearing set assembly that comprises a bearing unit and an annular hub body. The bearing unit includes: a tubular bearing spacer; an annular bearing-retaining sleeve disposed concentrically around the bearing spacer and cooperating with the bearing spacer to define a bearing-retaining space therebetween, the bearing-retaining sleeve having opposite first and second axial ends and an outer face, and being formed with an annular first flange that is disposed adjacent to the first axial end and that projects outwardly from the outer face; at least a bearing that is received in the bearing-retaining space; and a bearing cap that axially confronts and that radially surrounds the second axial end of the bearing-retaining sleeve, and that is formed with an annular second flange which extends outwardly therefrom and which is disposed opposite to the first flange in an axial direction relative to the bearing-retaining sleeve. The first and second flanges and the outer face of the bearing-retaining sleeve cooperatively define an annular retaining groove thereamong. The annular hub body is disposed concentrically around the bearing unit, and has a tire-retaining ring portion that is adapted to be connected to a tire and that has an inner wall which surrounds the bearing unit and which is formed with an annular tongue projecting radially and inwardly therefrom and fittingly received in the retaining groove, thereby preventing axial movement of the bearing unit relative to the hub body.

BRIEF DESCRIPTION OF THE DRAWINGS

In drawings which illustrate embodiments of the invention.

DETAILED DESCRIPTION OF THE PREFERRED EMBODIMENTS

Figure 1:
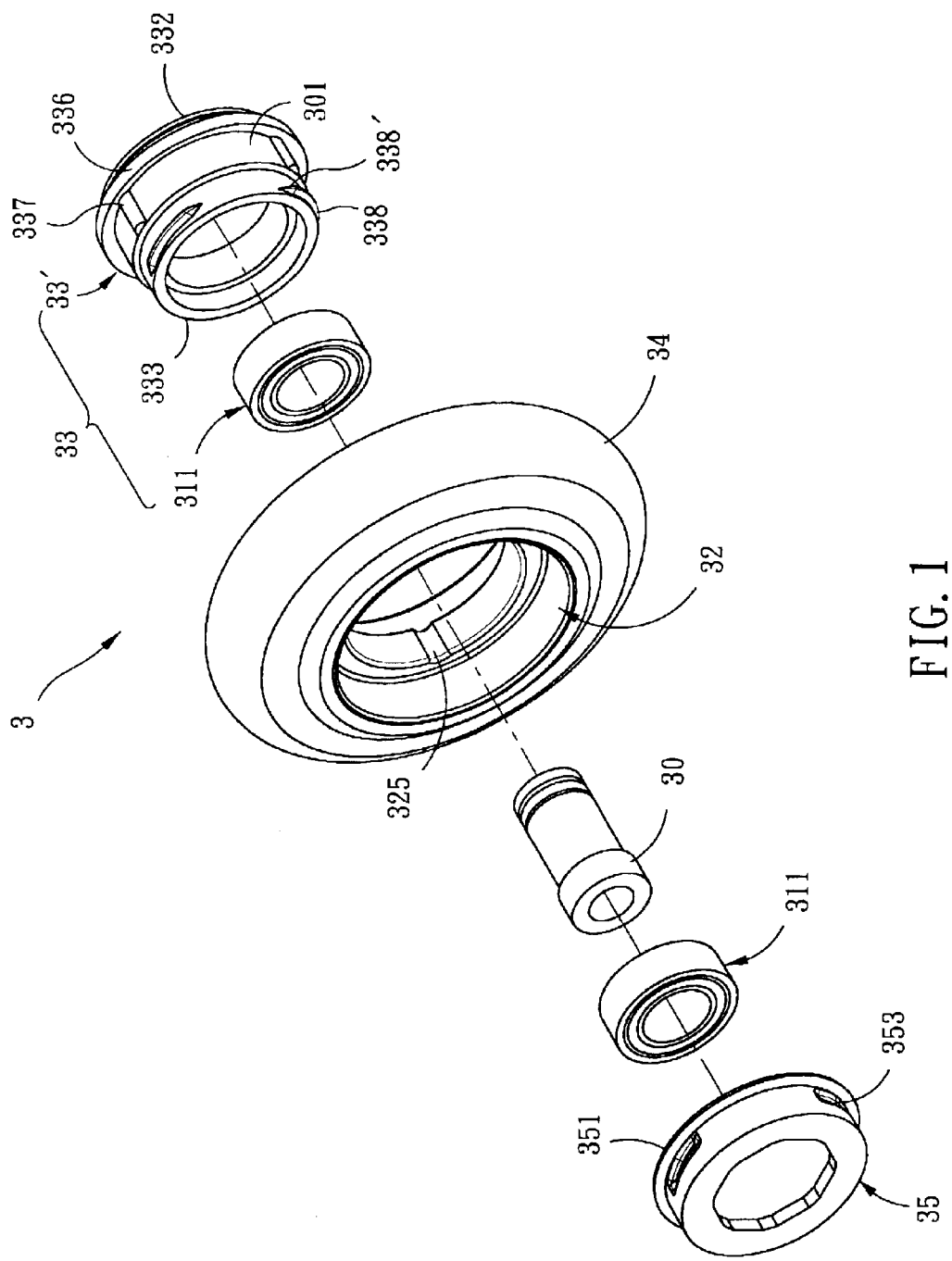
FIG. 1 is an exploded perspective view of the first preferred embodiment of a wheel hub-and-bearing set assembly according to this invention.

For the sake of brevity, like elements are denoted by the same reference numerals throughout the disclosure.

Figure 2:
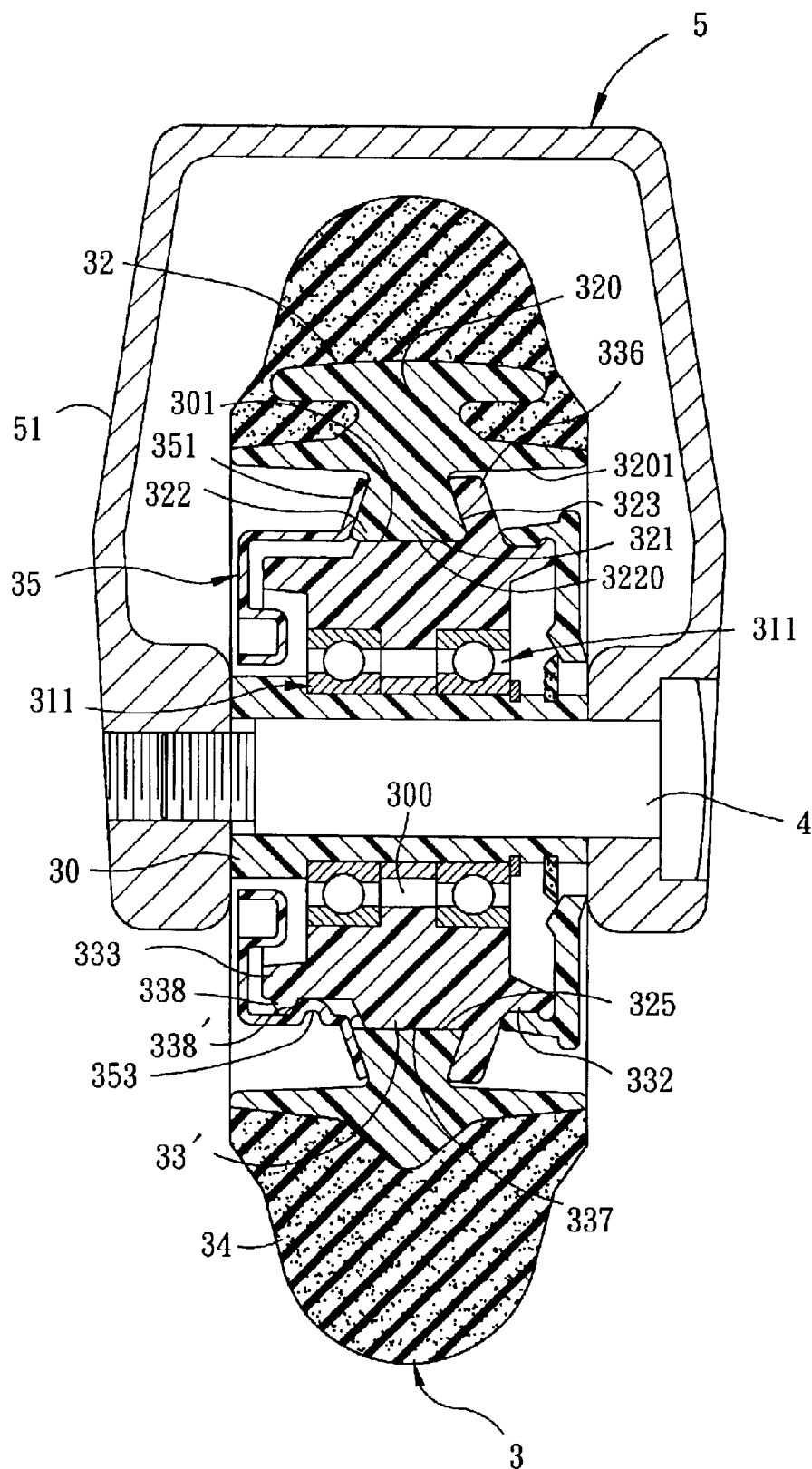
FIG. 2 is a sectional view of the wheel hub-and-bearing set assembly of FIG. 1, which is mounted on a frame through an axle.

FIGS. 1 and 2 illustrate the first preferred embodiment of a wheel hub-and-bearing set assembly 3 for a roller skate according to the present invention. The wheel hub-and-bearing set assembly 3 includes a bearing unit 33 and an annular hub body 32. The bearing unit 33 includes: a tubular bearing spacer 30; an annular bearing-retaining sleeve 33' disposed concentrically around the bearing spacer 30 and cooperating with the bearing spacer 30 to define a bearing-retaining space 300 therebetween, the bearing-retaining sleeve 33' having opposite first and second axial ends 332, 333 and an outer face 301, and being formed with an annular first flange 336 that is disposed adjacent to the first axial end 332 and that projects outwardly from the outer face 301; a pair of ball bearings 311 that are received in the bearing-retaining space 300; and a bearing cap 35 that axially confronts and that radially surrounds the second axial end 333 of the bearing-retaining sleeve 33', and that is formed with an annular second flange 351 which extends outwardly therefrom and which is disposed opposite to the first flange 336 in an axial direction relative to the bearing-retaining sleeve 33'. The first and second flanges 336, 351 and the outer face 301 of the bearing-retaining sleeve 33' cooperatively define an annular retaining groove 323 thereamong. The annular hub body 32 is disposed concentrically around the bearing unit 33, and has a tire-retaining ring portion 320 that is adapted to be connected to a tire 34 in a conventional manner and that has an inner wall 3201 which surrounds the bearing unit 33 and which is formed with an annular tongue 321 projecting radially and inwardly therefrom and fittingly received in the retaining groove 323, thereby preventing axial movement of the bearing unit 33 relative to the hub body 32 during skating.

In this embodiment, the annular tongue 321 preferably has a dovetail-shaped cross-section, and a distal end 322 that is distal from the inner wall 3201 of the tire-retaining ring portion 320. The aforesaid dovetail-shaped cross-section gradually diverges from the inner wall 3201 to the distal end 322 of the annular tongue 321. The distal end 322 of the annular tongue 321 defines an end face 3220 that abuts against the outer face 301 of the bearing-retaining sleeve 33' and that is formed with a plurality of axially extending grooves 325 which are angularly spaced apart from each other. The outer face 301 of the bearing-retaining sleeve 33' is formed with a plurality of axially extending protrusions 337 that respectively and releasably engage the axially extending grooves 325 so as to facilitate positioning of the bearing-retaining sleeve 33' in a space confined by the hub body 32. Note that the protrusions 337 and the axially extending grooves 325 are optional. Each of the protrusions 337 has a curved outer surface. Each of the axially extending grooves 325 has a curved inner surface that conforms to the curved outer surface of the respective one of the protrusions 337 so as to facilitate insertion or removal of the bearing-retaining sleeve 33' from the hub body 32.

The bearing cap 35 is further formed with a plurality of angularly spaced apart inner protrusions 353 that project therefrom toward the second axial end 333 of the bearing-retaining sleeve 33'. The second axial end 333 of the bearing-retaining sleeve 33' is formed with a plurality of angularly spaced apart outer protrusions 338 that project outwardly from the outer face 301 of the bearing-retaining sleeve 33' and that cooperate with the outer face 301 of the bearing-retaining sleeve 33' to define a plurality of recesses 338'. The bearing cap 35 is rotatable relative to the bearing-retaining sleeve 33' about an axis defined by the bearing-retaining sleeve 33' between an engaging position (see FIG. 2) in which the inner protrusions 353 respectively engage the recesses 338' so as to prevent removal of the bearing cap 35 from the bearing-retaining sleeve 33', and a releasing position (not shown) in which the inner protrusions 353 are respectively and angularly offset from the recesses 338' so as to disengage from the recesses 338' and so as to permit removal of. the bearing cap 35 from the bearing-retaining sleeve 33'.

The wheel hub-and-bearing set assembly 3 together with the tire 34 is mounted on an inverted U-shaped frame 5 through a threaded axle 4 that extends axially through the bearing spacer 30 and that threadedly engages a side leg 51 of the frame 5.

Figure 3:
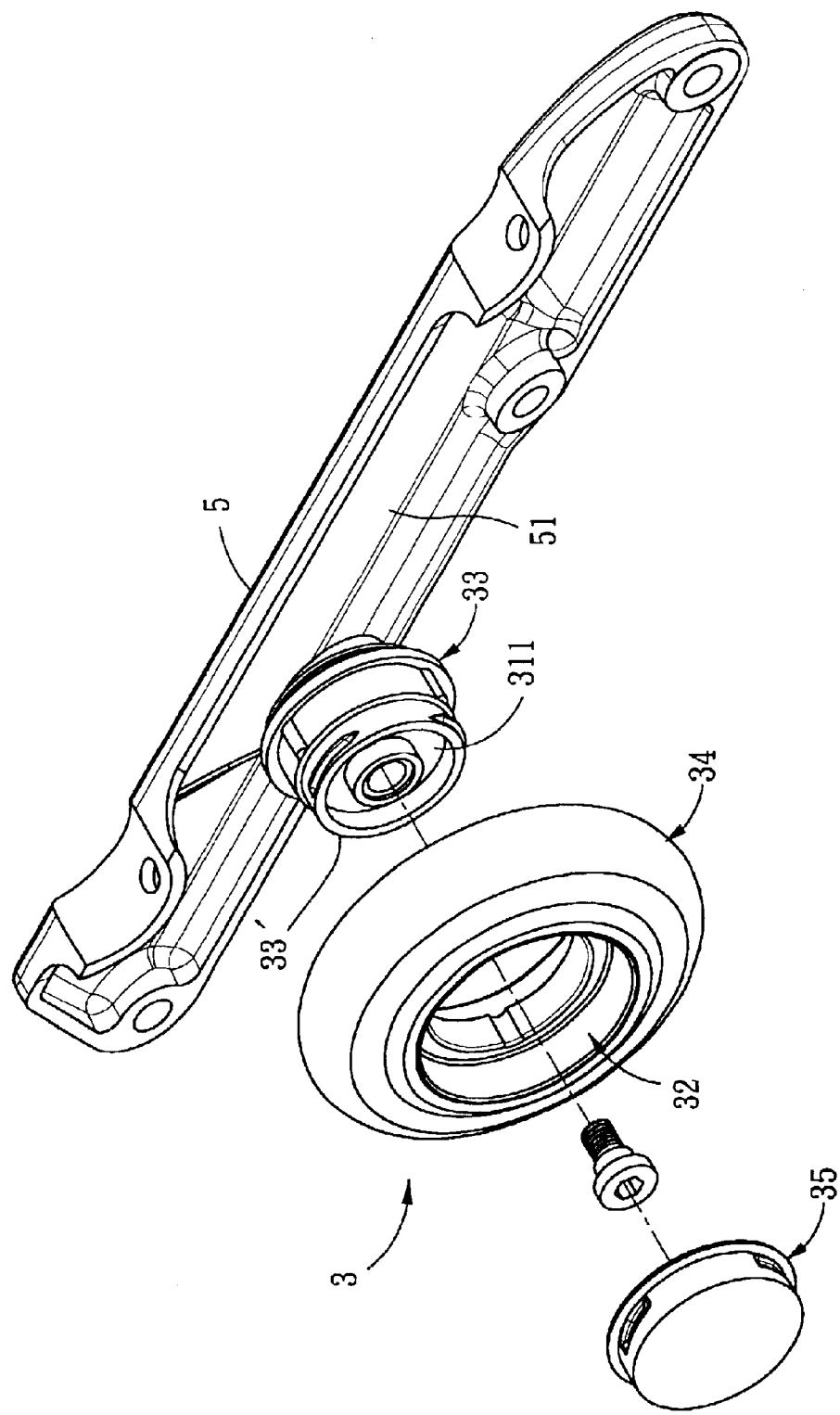
FIG. 3 is an exploded perspective view of the second preferred embodiment of the wheel hub-and-bearing set assembly together with a modified frame according to this invention.
Figure 4:
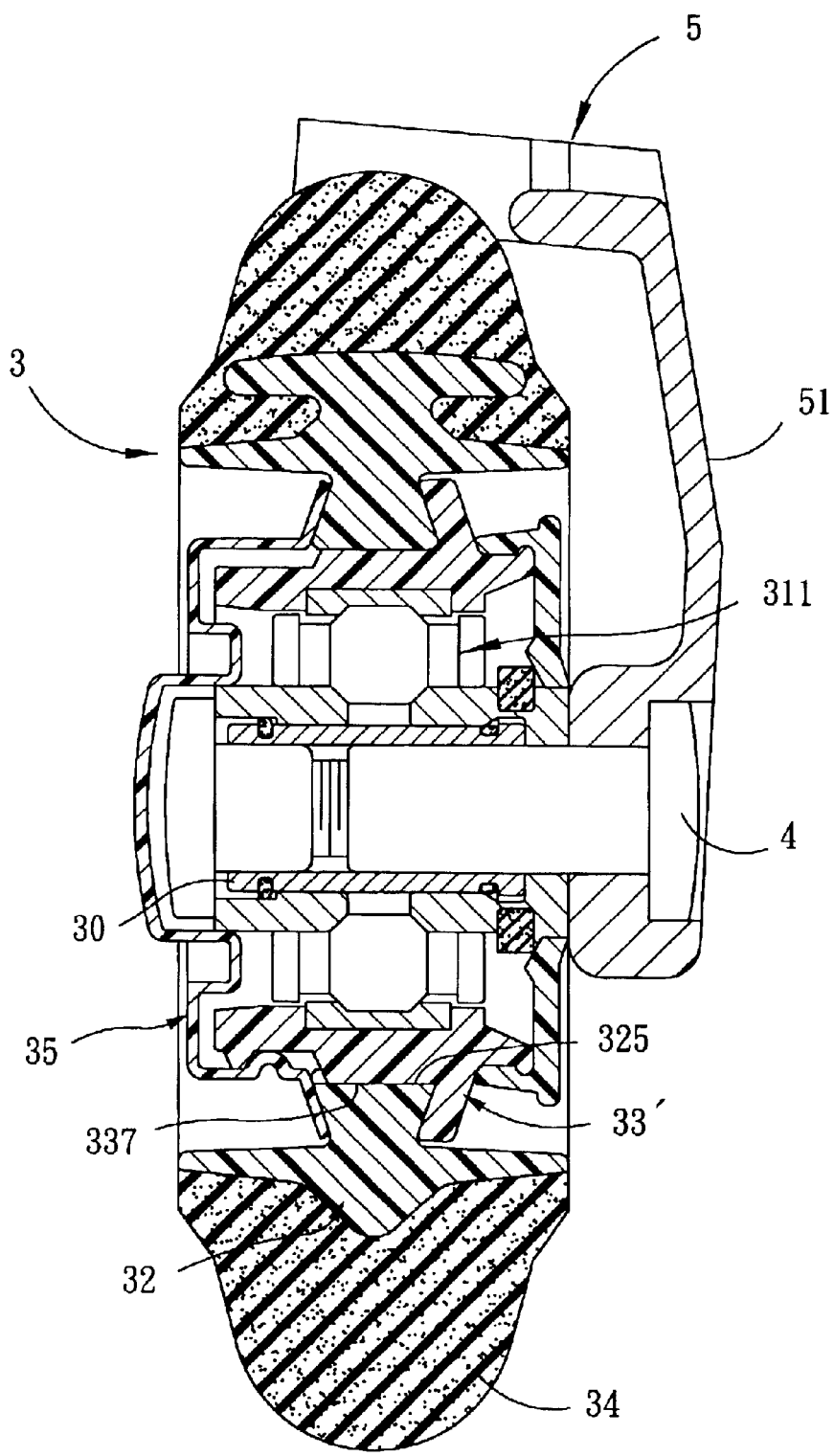
FIG. 4 is a sectional view of the wheel hub-and-bearing set assembly of FIG. 3.

FIGS. 3 and 4 illustrate a second preferred embodiment of the wheel hub-and-bearing set assembly 3 according to this invention. The wheel hub-and-bearing set assembly 3 is similar to the previous embodiment, except that the frame 5 has a substantially inverted L-shaped configuration with a single side leg 51 and that the bearings are roller bearings 311.

In case the tire 34 is severely worn out, the tire 34 together with the hub body 32 can be easily detached from the bearing unit 33 by first loosening the axle 4, rotating the bearing cap 35 to the releasing position, removing the bearing cap 35, followed by pulling the worn tire 34 together with the hub body 32 away from the bearing-retaining sleeve 33' (at this stage, the only engagement between the hub body 32 and the bearing unit 33 is the sliding engagement between the protrusions 337 and the axially extending grooves 325). This is especially important for a long distance or a marathon race contest, where a worn tire must be replaced as quickly as possible during the contest.

With the invention thus explained, it is apparent that various modifications and variations can be made without departing from the spirit of the present invention. It is therefore intended that the invention be limited only as recited in the appended claims.

I claim:

1. A wheel hub-and-bearing set assembly, comprising:
   a bearing unit including
      a bearing spacer,
      an bearing-retaining sleeve disposed concentrically around said bearing spacer and cooperating with said bearing spacer to define a bearing-retaining space therebetween, said bearing-retaining sleeve having opposite first and second axial ends and an outer face, and being formed with an annular first flange that is disposed adjacent to said first axial end and that projects outwardly from said outer face,
      at least a bearing that is received in said bearing-retaining space, and
      a bearing cap that axially confronts and that radially surrounds said second axial end of said bearing-retaining sleeve, and that is formed with an annular second flange which extends outwardly therefrom and which is disposed opposite to said first flange in an axial direction relative to said bearing-retaining sleeve, said first and second flanges and said outer face of said bearing-retaining sleeve cooperatively defining an annular retaining groove thereamong; and
   an annular hub body disposed concentrically around said bearing unit and having a tire-retaining ring portion that is adapted to be connected to a tire and that has an inner wall which surrounds said bearing unit and which is formed with an annular tongue projecting radially and inwardly therefrom and fittingly received in said retaining groove, thereby preventing axial and radial movement of said bearing unit relative to said hub body.

2. The hub-and-bearing set assembly of claim 1, wherein said annular tongue has a dovetail-shaped cross-section, and a distal end that is distal from said inner wall of said tire-retaining ring portion, said cross-section gradually diverging from said inner wall to said distal end.

3. The hub-and-bearing set assembly of claim 2, wherein said distal end of said annular tongue defines an end face that abuts against said outer face of said bearing-retaining sleeve and that is formed with a plurality of axially extending grooves which are angularly spaced apart from each other, said outer face of said bearing-retaining sleeve being formed with a plurality of axially extending protrusions that respectively and releasably engage said axially extending grooves.

4. The hub-and-bearing set assembly of claim 1, wherein said bearing cap is further formed with a plurality of angularly spaced apart inner protrusions that project therefrom toward said second axial end of said bearing-retaining sleeve, said second axial end of said bearing-retaining sleeve being formed with a plurality of angularly spaced apart outer protrusions that project outwardly from said outer face of said bearing-retaining sleeve and that cooperate with said outer face of said bearing-retaining sleeve to define a plurality of recesses, said bearing cap being rotatable relative to said bearing-retaining sleeve between an engaging position in which said inner protrusions respectively engage said recesses so as to prevent removal of said bearing cap from said bearing-retaining sleeve, and a releasing position in which said inner protrusions respectively disengage from said recesses so as to permit removal of said bearing cap from said bearing-retaining sleeve.

* * * * *